(12) United States Patent
Georgiano et al.

(10) Patent No.: US 7,039,291 B1
(45) Date of Patent: May 2, 2006

(54) CARD RACK

(76) Inventors: Joseph Georgiano, 43 Jerome Ave., Hicksville, NY (US) 11801; Irwin Math, 13 Wildwood La., Greenvale, NY (US) 11548

( * ) Notice: Subject to any disclaimer, the term of this patent is extended or adjusted under 35 U.S.C. 154(b) by 667 days.

(21) Appl. No.: 10/037,525

(22) Filed: Oct. 24, 2001

Related U.S. Application Data

(60) Provisional application No. 60/270,315, filed on Feb. 21, 2001.

(51) Int. Cl.
*G02B 6/00* (2006.01)
*B65D 6/24* (2006.01)

(52) U.S. Cl. .................. 385/147; 220/4.01; 220/4.28; 220/4.34

(58) Field of Classification Search ...... 220/4.01–4.03, 220/4.28, 4.33, 4.34, DIG. 25; 385/134–137, 385/147; 174/50
See application file for complete search history.

(56) References Cited

U.S. PATENT DOCUMENTS

| | | | | |
|---|---|---|---|---|
| 3,299,199 A | * | 1/1967 | Mattingly ..................... | 174/50 |
| 4,764,065 A | * | 8/1988 | Johnson ....................... | 411/21 |
| 6,411,526 B1 | * | 6/2002 | Nguyen et al. ............. | 361/829 |

* cited by examiner

*Primary Examiner*—Sarah Song
(74) *Attorney, Agent, or Firm*—Thomas A. O'Rourke; Bodner & O'Rourke

(57) ABSTRACT

A racking device for arranging various electronic components is described. The rack has a frame for receiving one or more modules that can be positioned in the rack. The modules have a rear wall and a pair of side panels and a top and bottom panel extending from the rear wall. One or more of the modules may have a face plate.

13 Claims, 7 Drawing Sheets

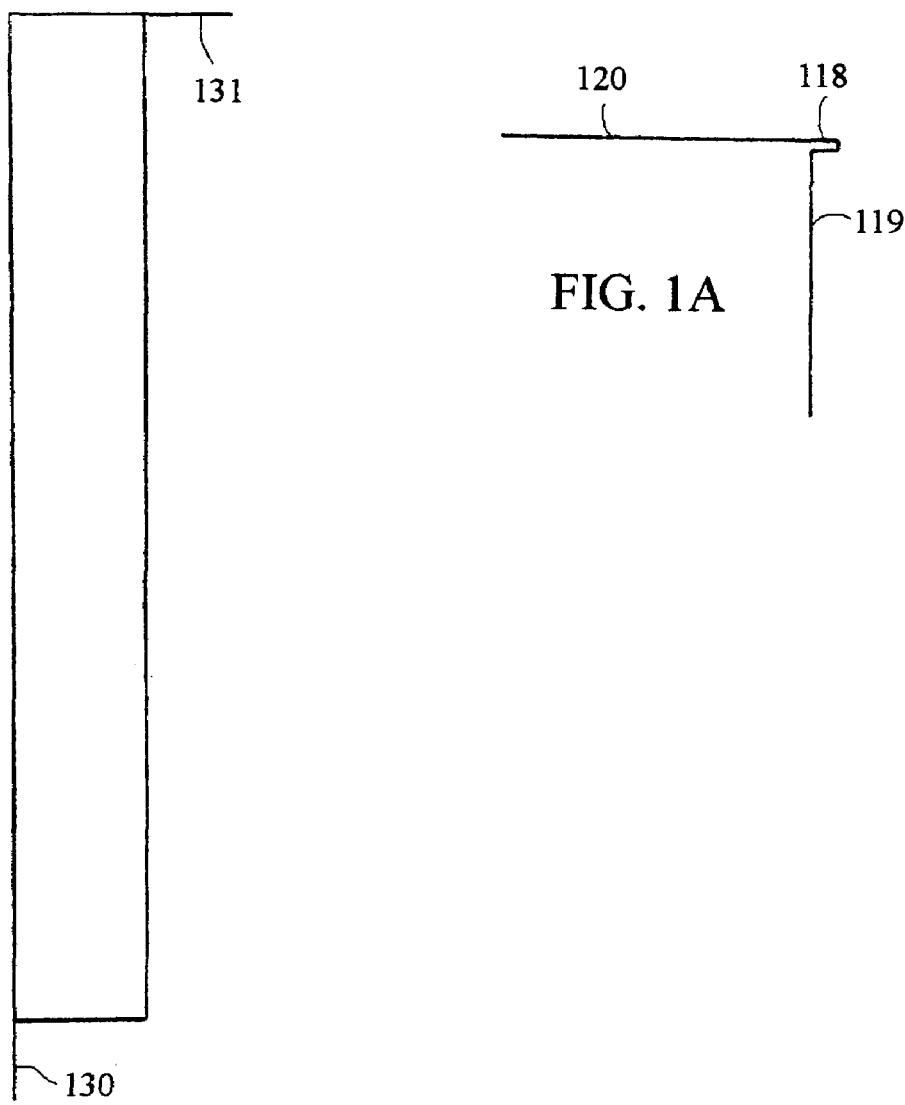
FIG. 7
FIG. 1A
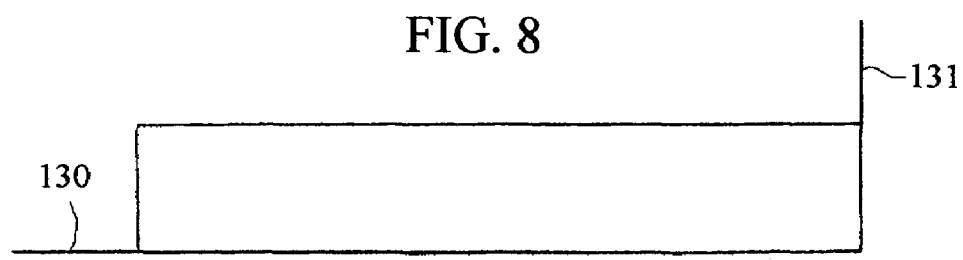
FIG. 8

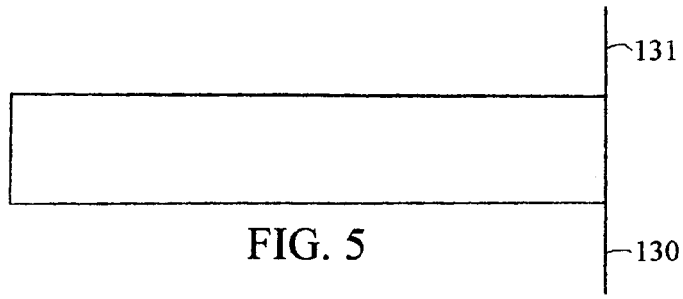
FIG. 5
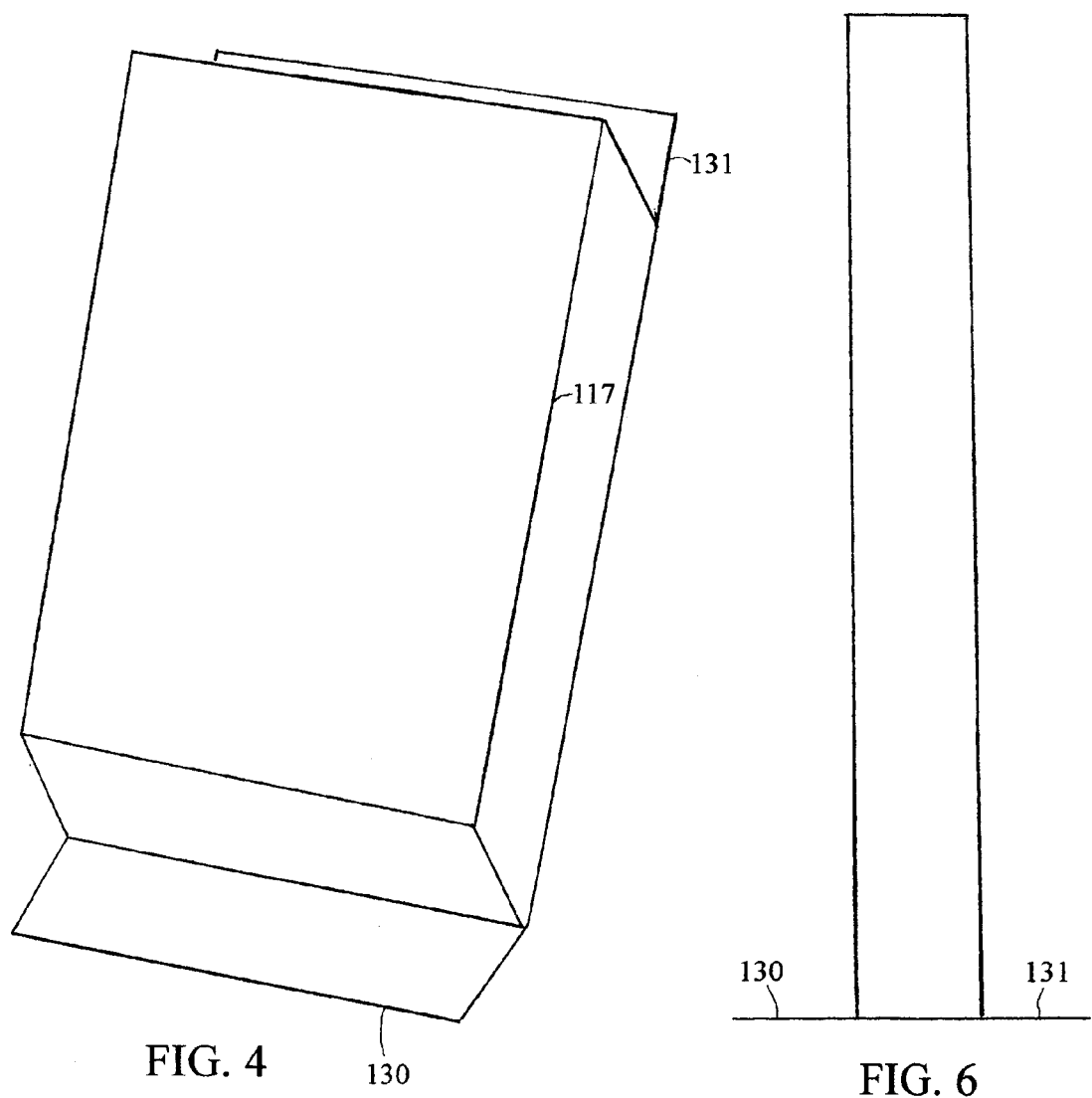
FIG. 4
FIG. 6

CARD RACK

This appln. claims the benefit of 60/270,315 filed on Feb. 21, 2001.

FIELD OF THE INVENTION

The present invention relates to improvements in devices for arranging and racking various electrical components that are used for a variety of applications. The present invention has particular applicability in racking fiber optic components.

BACKGROUND OF THE INVENTION

Card cage racks or chassis are well known in industry for supporting a variety of electrical components. For example, many commercial buildings today have very complex communications and other electrical needs. In order to provide these commercial establishments with telephone and other communications service that is necessary today, many buildings have dedicated areas or closets for storing this type of equipment. These storage areas are rapidly becoming filled with a variety of electrical components. As a result, there is a need for a device for accommodating this equipment in an orderly, safe and accessible manner. Traditionally, the industry has used a variety of card cage racks to accommodate various modules that are used.

Modern electronic systems often employ a number of electronic circuit modules, typically printed wiring boards (PWBs) or printed circuit (PC) cards populated with electronic components and connectors, mounted in an electronic housing or rack. Typical racks often include a plurality of card slots for receiving circuit modules, with card edge guides to hold the cards in alignment, insertion/removal elements, a card connector, and a backplane for providing circuit interconnections. Circuit backplanes are often multilayer printed wiring boards designed for high speed interconnection of signals between different circuit components mounted on physically separated circuit modules in different slots. In most configurations, the circuit modules include electrical connectors affixed to the rear of the circuit module that are plug-action coupled to mating connectors on the backplane.

In some rack configurations, for example those employed in the cable television (CATV) and other telecommunications equipment industries, the circuit modules include discrete drop side signal connectors (electrical and/or optical) affixed to the circuit modules that couple to cables that carry signals to and from the equipment rack. In some of these configurations, the discrete signal connectors are mounted to the rear edge of the circuit modules and extend through openings in and the backplane and the housing rack so as to allow connection of the drop side signal cables. In other configurations, connectors are provided on the front edge of a circuit module to allow for signal insertion and extraction.

These card cage racks are typically in the form of a box like container having a base member and a top member that are provided with a plurality of rails for retaining cards or modules that are to be held by the rack. The base member and the top member are joined by a pair of opposing side walls and a rear wall. Positioned within the card cage structure are card rails or guides that extend generally between the front and rear cross members. These card guides have grooves that are opposing between the lower and upper card guide rails, for receiving the edges of the circuit boards. The card guides are also laterally spaced from each other, to provide space between the electrical and electronic components secured to the circuit boards. At the end of the known circuit boards, there is an electrical connection that interconnects with an electrical connection on the rear panel, known as the back plane electrical connector. The front wall area is typically left open to install the cards. Once the cards are installed there may be a front cover that is placed over any remaining empty slots in the rack to protect them. The cover is usually connected to flanges that extend from the side walls of the rack to hold the cover.

One of the problems with racks of the prior art is their lack of interchangeability and the absence of modularity. Prior art racks come in different sizes and configurations and as a result, the customer or the supplier was required to keep on hand a number of different sizes and configurations. This requires a significant investment. In addition, the prior art racks because of their complexity were relatively expensive.

OBJECTS OF THE INVENTION

It is an object of the present invention to provide an improved module for carrying electrical and/or optical components.

It is also an object of the invention to provide an improved card rack for electrical components including fiber optic components.

It is an object of the present invention to provide a system whereby the expensive prior art racks are eliminated.

It is also an object of the present invention to provide a modular approach to arranging electrical components.

It is further object of the present invention to provide a module that may be attached to a ceiling, wall or other surface while the same module may be connected to a face plate.

It is another object of the present invention to provide a rack that can be used in a variety of applications.

It is an object of the present invention to provide an enclosed case that may contain a metal that provides electro magnetic shielding.

SUMMARY OF THE INVENTION

The present invention is directed to a unique racking system. The racking system of the present invention eliminates the need for the traditional rack. The rack of the present invention has applicability in a number of applications and in particular in fiber optic applications, to be mounted to consoles, power utility control rooms, in customized installations, in television and radio studios, etc. According to the present invention there is provided one or more and more preferably three or more modules. The modules typically have a rear wall that has a pair of side panels and a top and bottom panel extending from the rear wall to form a module with an open end. There may also be a front panel in some applications generally enclosing the module. One or more modules of the present invention may be joined to a faceplate. Alternatively, the individual modules may be directly secured to a wall, ceiling or other surface as desired The individual modules may be secured to a wall, ceiling or other surface by one or more ears extending from one or more of the front or rear panels, or the top or bottom walls or the side walls. The ears may be integral with the walls or panels or may be a separate member removably connected thereto.

In a preferred embodiment, one side panel has a base section and a pair of sidewalls that extend upwardly from the edges of the base section. Each sidewall has a first edge that is connected to an edge of the base section and a second edge that is connected to a first flange. Each of the first flanges is generally parallel to the base section and generally perpendicular to the sidewalls. The first pair of flanges extends outwardly from the sidewall on the side of the sidewall opposite the base plate. One purpose of the first pair of flanges is to permit the module to be attached to a wall, a ceiling or other surface if desired. Also extending from one side edge of each of the sidewalls is a second flange. The second flange on each sidewall extends perpendicularly from a side edge of the sidewall. The second flange on each sidewall is also generally perpendicular to the first flange and the base section. As with the first flange the second flange extends outwardly from the sidewall on the side of the sidewall opposite the base plate. The modules are adapted to be connected to a faceplate by the second set of flanges extending from the sidewalls.

There is also a top plate that is adapted to be attached to the front wall and the rear wall to form an enclosed module. In an alternative embodiment, either the front plate or the rear plate or both may be removed from the module as the component contained therein have features gauges or indicator lights that must be accessible to the users or their staff. The faceplate may receive a plurality of modules in a side-to-side or other relationship as desired.

On of the advantages of the present invention is that the expensive box like prior art rack is no longer needed. In addition, the modularity of the present invention permits interchangeability of the parts thus reducing the cost of manufacture and the need to stock multiple sizes of the product. Furthermore, traditional racks were limited in their versatility and were not able to be adapted to a variety of applications as is the modules of the present invention.

BRIEF DESCRIPTION OF THE DRAWINGS

FIG. 1a shows a representative connecting means for forming the members of the module of the present invention

FIG. 4 is a perspective view of an alternative embodiment of a module of the present invention.

FIG. 5 is a side view of an alternative arrangement of the module of the present invention.

FIG. 6 is a side view of an alternative arrangement of the module of the present invention.

FIG. 7 is a side view of an alternative arrangement of the module of the present invention.

FIG. 8 is a side view of an alternative arrangement of the module of the present invention.

DETAILED DESCRIPTION OF THE INVENTION

Figure 2:
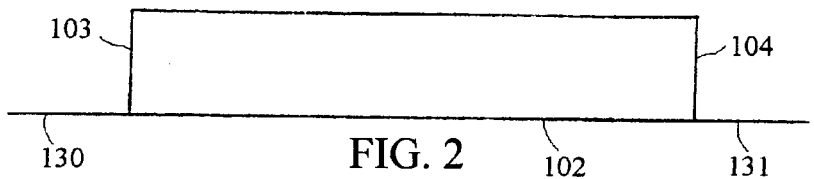
FIG. 2 is an end view of the module of FIG. 1.
Figure 1:
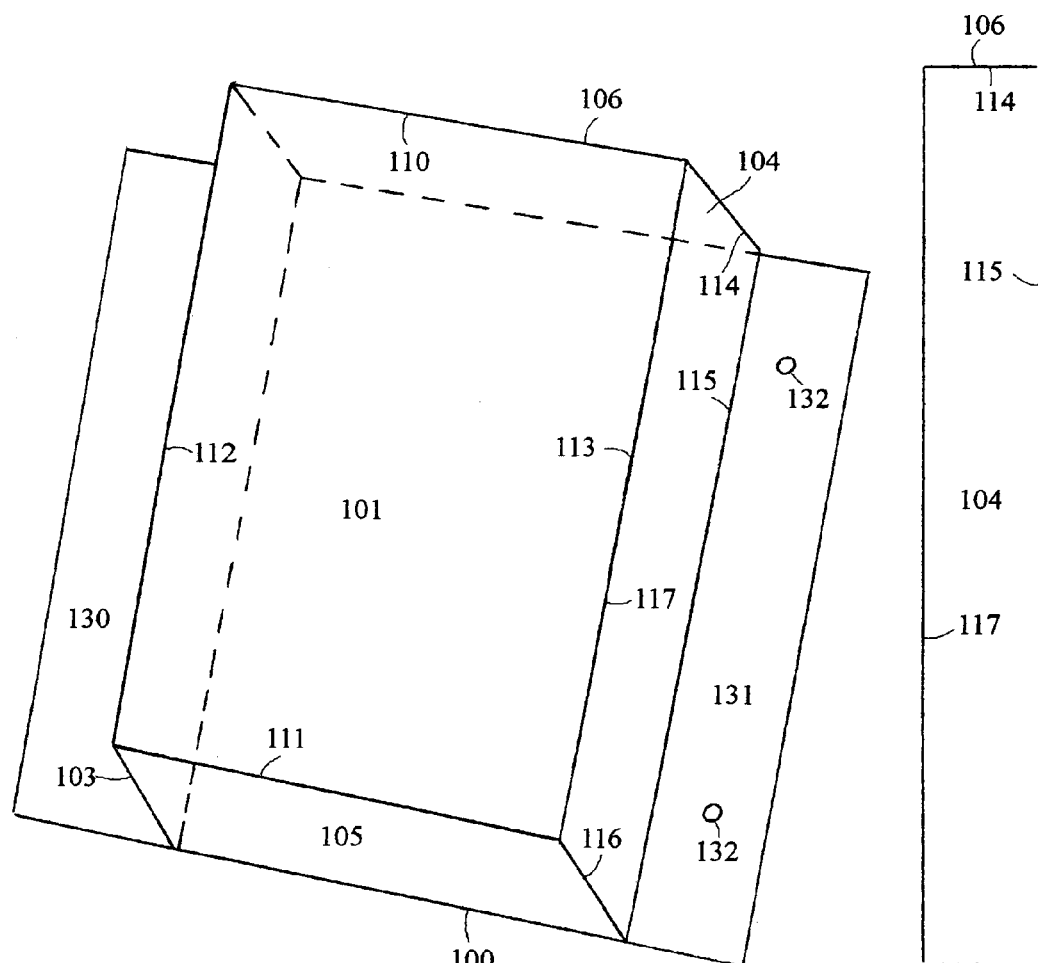
FIG. 1 is a perspective view of a module of the present invention.
Figure 3:
FIG. 3 is a side view of the module of FIG. 1.

The present invention is directed to a module 100 for holding an electrical component. The module typically has a top member 101 and a base member 102 joined by a pair of side members 103 and 104. The top member 101 may have top edge 110, bottom edge 111, and side edge 112 and 113. The base member 102 similarly has a corresponding top edge, bottom edge, and side edges. The side members 103 and 104 are similarly arranged with edges 114, 115, 116 and 117.

The top, base and side members preferably form a generally rectangular configuration. The top base and side members may be a single combined unit or they may be made up of individual top base and side members that have been connected by a suitable means. In another embodiment, the members may be in the form of units of two or more preformed members that are adapted to receive the remaining member(s) to form the module. For example, a top member and a side member may be a single member that forms a generally "L" shaped member. This combined member could be combined with two separate members, a bottom member and another side member or another "L" shaped module. Similarly, there can be a single generally "U" shaped member that may combined in a single unit a top member, a bottom member and a side member joining the top and bottom member. Alternatively, there can be two side members joined by either a top or bottom member. Preferably, all of the members are at generally right angles to each other.

One suitable means of connecting the walls is by welding another means is by providing each member 119 with a recessed portion 118 that mates with the respective edge of the adjacent member 120. The connection may be a friction fit or there may be an adhesive present securing the members of the module together. Those skilled in the art will recognize that there are other means of connecting the members to form the module of the present invention. On one open end 105 of the module there may be a front plate (not shown) and on the other open end 106 of the module there is a rear plate (not shown). One or more of the plates may be opened or have one or more openings to permit electrical connections with the interior of the module. The front plate or the rear plate or both, may be connected to a faceplate. Alternatively, the front or rear plate or both may be removed and the open end may be connected to a face plate by any suitable means. It will be appreciated by those skilled in the art that the front plate and the rear plate may be connected to the remainder of the module by any suitable means.

In one embodiment of the present invention, either the top member or the bottom member may have a pair of flanges 130 and 131 that extend outwardly from the side edges 112 and 113 of the top or bottom member. These flanges provide a means for mounting the module on a wall, ceiling or elsewhere as a stand alone unit or in combinations of modules. As seen in FIG. 4 the flanges 130 and 131 may also extend from the top edge 110 and the bottom edge 111 of the top member or the base member. FIG. 5 shows another embodiment where the flanges 130 and 131 extend from a side member. FIG. 6 shows another arrangement of the flanges 130 and 131. FIGS. 7 and 8 show an arrangement of flanges that are particularly useful where the module will be in a corner where two walls meet, where the ceiling and a wall meet or where the floor and a wall meet. It will be appreciated by those skilled in the art that the flanges 130 and 131 can be arranged in any number of ways on the modue to fit the needs of the equipment and the location. The flanges may also be provided with one or more orifices 132 to aid in mounting the module to a surface. Although the flanges are shown extending from one end of the module to the other, it will be appreciated by those skilled in the art that the flanges can be one or more tabs that have orifices therein instead.

Figure 9:
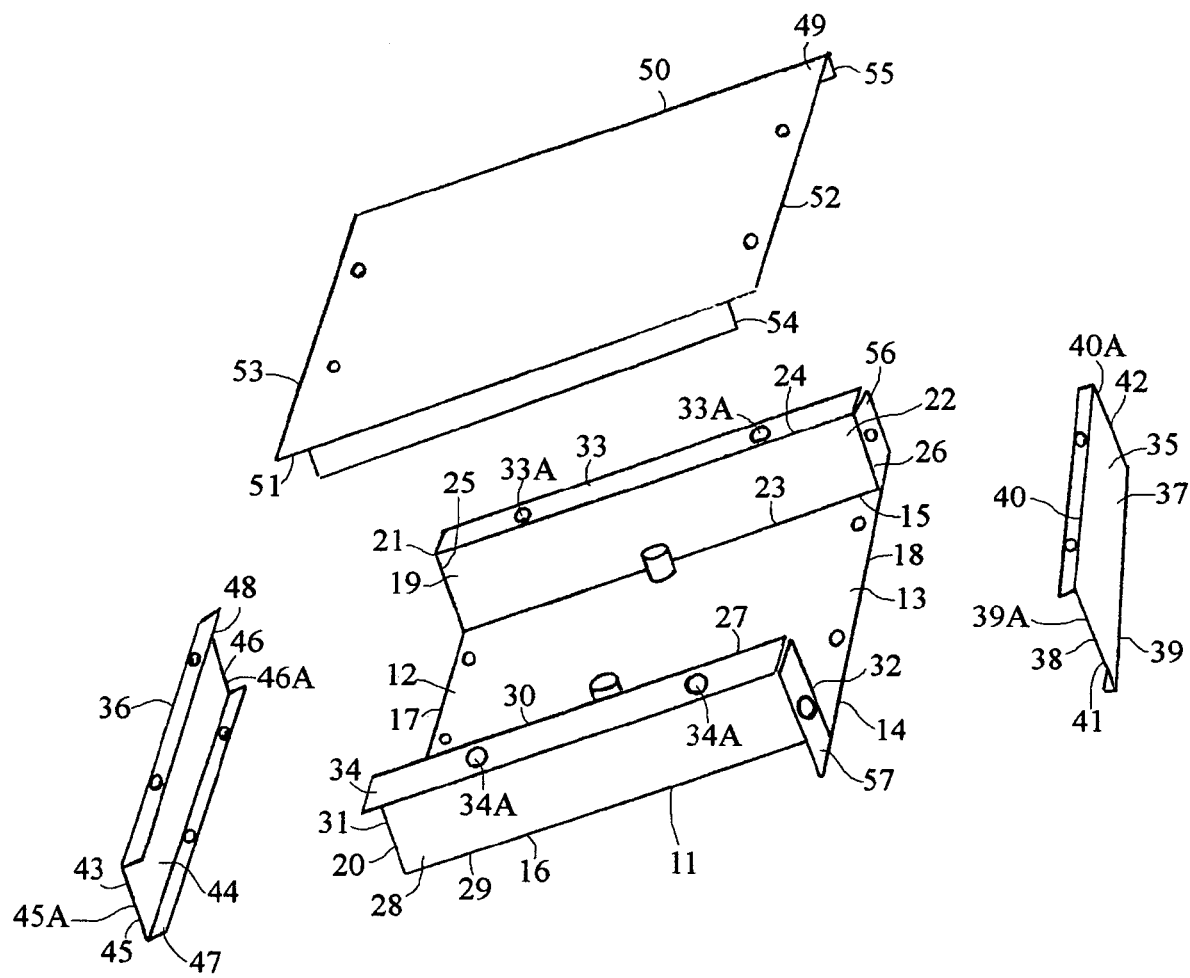
FIG. 9 is an exploded view of a preferred embodiment of the module of the present invention.

A preferred embodiment of the present invention shown in FIG. 9. There is a module 10 having a first or base member 11, which constitutes one of the sidewalls of the module. The first or base member has a base 12 which may be flat and has a top surface 13 and a bottom surface 14 as well as a pair of side edges 15 and 16. There is also a front edge 17 and a rear edge 18 that extend from the side edges 15 and 16. Extending upwardly from side edge 15 is the top member 19 of the module 10. Extending upwardly from the side edge 16 is the bottom member 20. The top member 19 and bottom member 20 are preferably generally perpendicular to the base 12 and generally parallel to each other. It will be appreciated by those skilled in the art the other configurations are also possible for the relationship between the top member and bottom member. The top member 19 has a top surface 21 and a bottom surface 22 as well as a first side edge 23 and a second side edge 24. First side edge 23 is adjacent to side edge 15 of the base 12. The top member also has a front edge 25 and a rear edge 26.

The bottom member 20 has a top surface 27 and a bottom surface 28 as well as a first side edge 29 and a second side edge 30. First side edge 29 is adjacent to side edge 16 of the base 12. The bottom member also has a front edge 31 and a rear edge 32. Flange 33 extends outwardly from the top surface 21 of the top member and is preferably generally perpendicular to the top surface of the top member and generally parallel to the flat base 12. Flange 34 extends outwardly from the bottom surface 28 of the bottom member and is similarly is preferably generally perpendicular to the bottom surface of the bottom member and generally parallel to the flat base 12. Flanges 33 and 34 are usually provided with one or more orifices 33A and B and 34A and B for fastening the flanges of the module to a wall or other surface by any suitable means known to those skilled in the art. These means may include nailing, screws, adhesives etc.

The module 10, in addition to the first or base member 11 has a front plate 35 and a rear plate 36. Front plate 35 has a front surface 37 and a rear surface 38 as well as side edges 39 and 40. Extending rearwardly from the rear surface 38 of the front plate 35 is a pair of flanges 41 and 42. Flange 41 extends from side edge 39 while flange 42 extends from side edge 40. The flanges are preferable generally parallel to each other and generally perpendicular to the rear surface 38 of the front plate 35. The front plate 35 may be provided with one or more cut out portions to provide access to the component contained within the module. The front plate 35 is joined to the first member by a suitable fastening means that extends through the first member 11 and the flange 41 of the front plate 35. Although the face plate is shown with the flanges extending from side edge 39 and side edge 40, it will be appreciated by those skilled in the art that the flanges can alternatively extend from side edges 39A and 40A of the front plate if desired and if corresponding modifications are made to the first or base member as well.

Rear plate 36 has a front surface 43 and a rear surface 44 as well as side edges 45 and 46. Extending frontwardly from the rear surface 44 of the plate 36 are a pair of flanges 47 and 48. Flange 47 extends from side edge 45 while flange 48 extends from side edge 46. The flanges are generally parallel to each other and generally perpendicular to the rear surface 44 of the rear plate 36. The rear plate 36 may be provided with one or more cut out portions to provide access to the component contained within the module. The rear plate 36 is joined to the first member by a suitable fastening means that extends through the first member 11 and the flange 47 of the rear plate 36. Although the face plate is shown with the flanges extending from side edge 45 and side edge 46, it will be appreciated by those skilled in the art that the flanges can alternatively extend from side edges 45A and 46A of the front plate if desired and if corresponding modifications are made to the first or base member as well.

Attached to flange 42 in the front plate 35 and flange 48 in the rear plate is a second side member 49. Second side member 49 is generally a flat plate having top and bottom edges 50 and 51 as well as front and rear edges 52 and 53. Second side member 49 may be attached to the flanges 42 and 48 by any suitable means such as by a screw or other suitable fastener. The second side member may be provided with supports 54 and 55 that provide additional rigidity to the side member. Support 54 is adjacent to top surface 27 of bottom member 20. Support 55 is adjacent to bottom surface 22 of top member 19. The edges 26 and 32 are provided with a pair of attachment members 56 and 57. The attachment members are each preferably provided with an orifice of other means for fastening a faceplate to the module. The attachment members are generally perpendicular to the base 12 and the bottom and top members 19 and 20. The attachment members 56 and 57 are also generally parallel to front plate 35 if a front plate is present.

Figure 10:
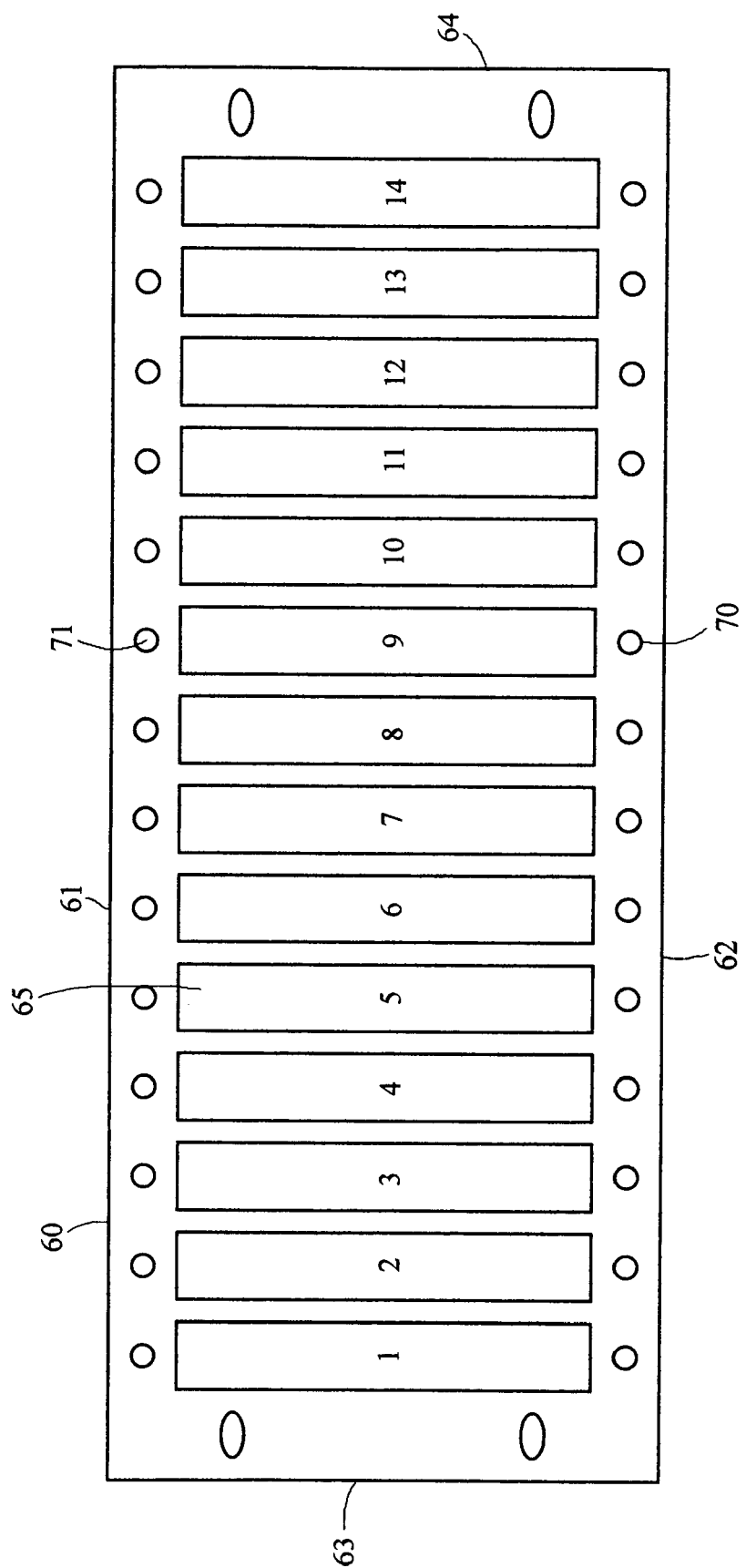
FIG. 10 is an example of a three U faceplate for use in the present invention.
Figure 11:
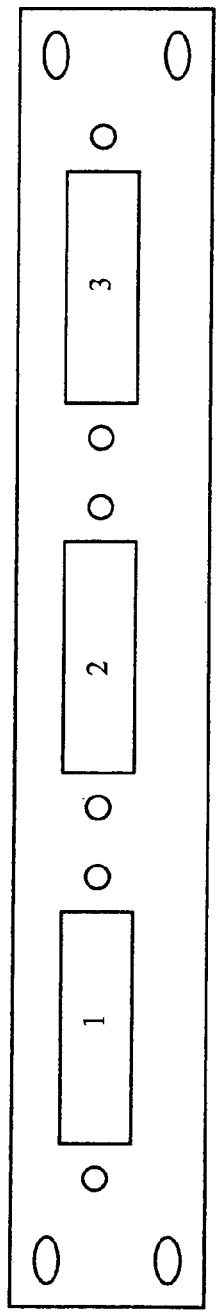
FIG. 11 is a example of a one U face plate for use in the present invention.
Figure 12:
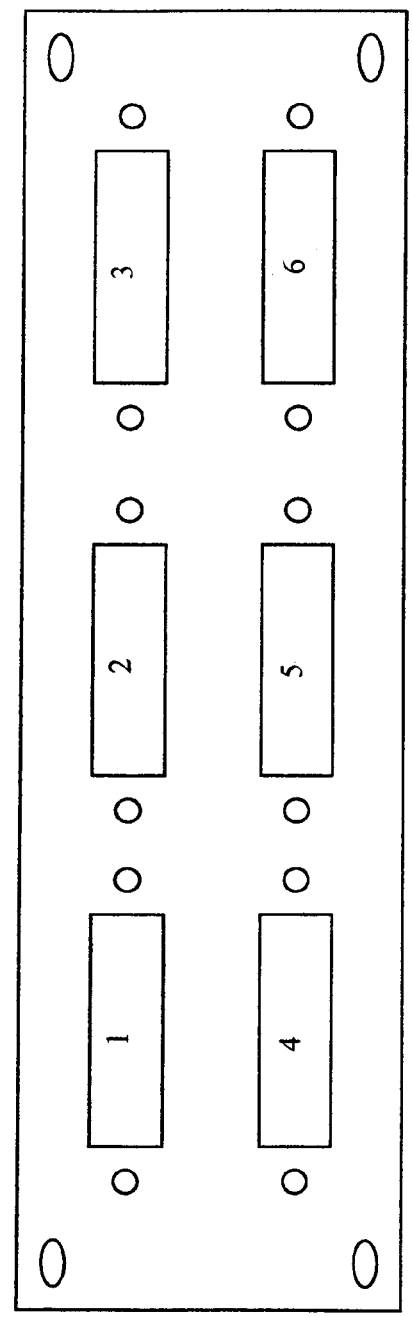
FIG. 12 is a example of a two U face plate for use in the present invention.

The module may be any width desired for the application. Similarly, the depth of the module may also vary as desired. One of the advantages of the module of the present invention is the modularity of the components. For example, where the width of the module must be increased to accommodate a larger component, the first member need not be replaced in view of the increase in width. Similarly, the size of the second side member need not change in a dimension. Only the front and rear plate dimensions are required to change. As result, fewer types of component pieces are necessary to have in inventory to accommodate changes in the widths of the components. Another significant advantage over the prior art cage is that the electrical components contained within the module of the present invention are protected mechanically, electrically and/or magnetically in a superior fashion compared to the components contained in the traditional rack system.

Where there are a plurality of modules in the system, they can be linked or joined together by means of face plate 60. Face plate 60 is typically adapted to receive a number of modules together. The face plate 60 shown in FIG. 10 is a three U face plate. The three U face plate 60 of FIG. 10 may have room for any number of modules in a side to side relation. The face plate of FIG. 10 will accept up to 14 modules. FIG. 11 is an example of a one U face plate for use in the present invention. This face plate will accept up to three modules. FIG. 12 is an example of a two U face plate for use in the present invention. This face plate will accept up to six modules. It will be appreciated that the face plates may be of virtually any size as desired.

The face plate 60 is generally rectangular in shape with a top edge 61 a bottom edge 62 and side edges 63 and 64. The face plate 60 is provided with a plurality of openings 65 to accommodate the openings in the modules for the components. The openings are preferably rectangular in shape, having two long sides 66 and 67 and two short sides 68 and 69. Above and below the short sides are orifices 70 and 71 for receiving a connecting means for connecting the module to the face plate.

Figure 13:
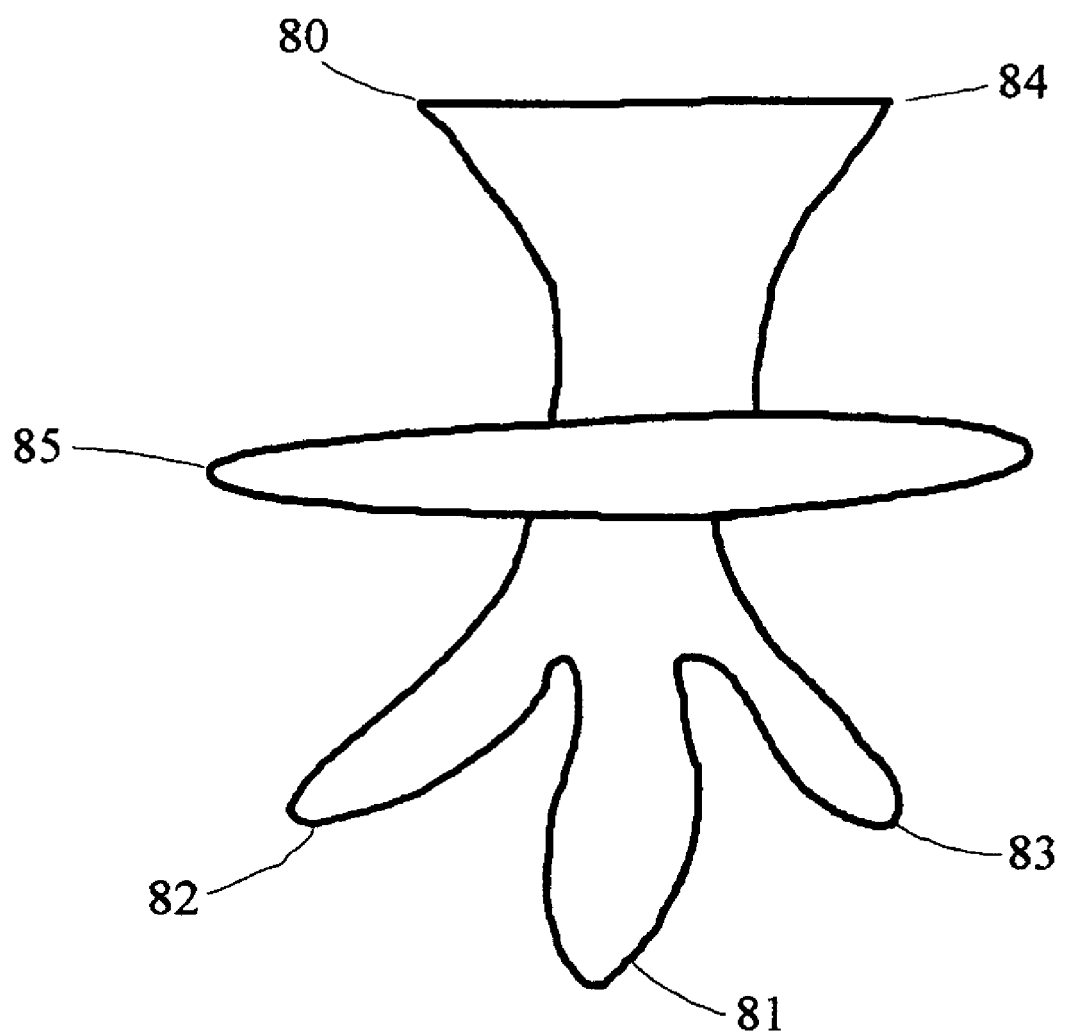
FIG. 13 is an example of a preferred fastening means of the present invention that may be used with the modules of the present invention.

The connecting means may be any suitable article. For example, the connecting means may be a screw, or other fastener. A preferred fastening means is shown in FIG. 13. The fastener 80 of FIG. 5 has two members. A pin 81 having a head 84 passes through a ring 85. The ring 85 has two or more wings 82 and 83 extending from the underside of the ring. When the fastening means is being used to secure two members the head is in a raised position so that the pin and the wings may pass through the orifices of the members to be joined. Once through the orifices, the downward motion of the head causes the wing to expand thus causing the two members to be secured together. If the two members need to be separated raising the pin will cause the wings to retract thus permitting removal to the fastening means.

We claim:

1. A module for containing electrical components comprising
    a first member which forms a first side wall of the module said first member having a base with a top surface and a bottom surface and a first side edge and a second side edge, said first side wall of the module also having a front edge and rear edge extending outwardly from said side edges generally in a perpendicular relationship to said base and generally in a parallel relationship with each other, said front edge and said rear edge forming a top and a bottom member respectively of said module, the top member having a top surface and a bottom sure as well as a first side edge and a second side edge, said first side edge being adjacent to said first side edge of the base, said bottom member having a top surface as well as a first side edge and a second side edge, said first side edge of said bottom member being adjacent to said second side edge of the base; said top member having a first flange extending outwardly from said top surface of the top member and adjacent to a second side edge of said top member and generally in a perpendicular relationship to said top member and generally in a parallel relationship to said base, said bottom member having a second flange extending outwardly from a bottom surface of the bottom member and adjacent to a second side edge of said bottom member and generally in a perpendicular relationship to said bottom member and generally in a parallel relationship to said base; said top member having a third flange extending outwardly from said top surface of the top member and adjacent to a third side edge of said top member and generally in a perpendicular relationship to said top member, said first flange and said base, said bottom member having a fourth flange extending outwardly from said bottom surface of the bottom member and adjacent to a third side edge of said bottom member and generally in a perpendicular relationship to said bottom member, said second flange and said base; wherein said first and second flanges provide a means of attachment to a surface such that said base is generally parallel to said surface and wherein said third and fourth flanges provide a second means of attachment on a surface wherein said base is generally perpendicular to said surface;
    a front plate, said front plate having a front surface and a rear surface as well as first and a second side edges; said front plate being removably connected to the first member; and
    a rear plate, said rear plate having a front surface and a rear surface as well as first and second side edges, said rear plate being removably connected to the first member; and
    a second member which forms a second side wall of said module, said second side member having top and bottom edges as well as front and rear edges, said second side member being removably connected to said top and bottom members of said first member.

2. The module according to claim 1 wherein said flanges are provided with one or more orifices for fastening the flanges to a wall or other surface.

3. The module according to claim 1 wherein said first font plate has a first flange extending from one side edge of said front plate.

4. The module according to claim 3 wherein said so front plate has a second flange extending from the other side edge of said front plate.

5. The module according to claim 4 wherein said first and second flanges are generally parallel to each other and generally perpendicular the rear surface of the front plate.

6. The module according to claim 5 wherein the front plate is provided with one ore more cut out portions to provide access to a component contained within the module.

7. The module according to claim 6 wherein the first member is connected to a flange in the front plate by a suitable fastening means that extends through the first member ++ and the flange of the front plate.

8. The module according to claim 6 wherein a pair of flanges extend frontwardly from the rear surface of the rear plate.

9. The module according to claim 1 wherein said rear plate has a first flange extending from one side edge of said rear plate.

10. The module according to claim 9 wherein said rear plate has a second flange extending from the other side edge of said rear plate.

11. The module according to claim 10 wherein said first and second flanges are generally parallel to each other and generally perpendicular the rear surface of the rear plate.

12. The module according to claim 11 wherein the rear plate is provided with one ore more cut out portions to provide access to a component contained within the module.

13. The module according to claim 12 wherein the first member is connected to a flange in the rear plate by a suitable fastening means that extends through the first member and the flange of the rear plate.

* * * * *